(12) United States Patent
Cendoya

(10) Patent No.: US 11,668,365 B2
(45) Date of Patent: Jun. 6, 2023

(54) VALVE BODY FOR A DAMPER

(71) Applicant: DRiV Automotive Inc., Lake Forest, IL (US)

(72) Inventor: Alexander Alvarez Cendoya, Ermua (ES)

(73) Assignee: DRiV Automotive Inc., Lake Forest, IL (US)

( * ) Notice: Subject to any disclaimer, the term of this patent is extended or adjusted under 35 U.S.C. 154(b) by 263 days.

(21) Appl. No.: 16/578,519

(22) Filed: Sep. 23, 2019

(65) Prior Publication Data

US 2021/0088098 A1 Mar. 25, 2021

(51) Int. Cl.
| | |
|---|---|
| F16F 9/348 | (2006.01) |
| F16K 31/42 | (2006.01) |
| F16F 9/18 | (2006.01) |
| F16F 9/32 | (2006.01) |

(52) U.S. Cl.
CPC .............. F16F 9/348 (2013.01); F16F 9/185 (2013.01); F16F 9/3242 (2013.01); F16K 31/42 (2013.01)

(58) Field of Classification Search
CPC .......... F16F 9/3242; F16F 9/348; F16F 9/185; B60G 13/08; F16K 31/42
USPC ............................................. 188/322.14, 315
See application file for complete search history.

(56) References Cited

U.S. PATENT DOCUMENTS

| | | | | |
|---|---|---|---|---|
| 4,597,411 A | * | 7/1986 | Lizell ..................... | F16F 9/185 137/516 |
| 4,905,799 A | * | 3/1990 | Yamaoka ................ | F16F 9/348 188/322.22 |
| 5,115,892 A | * | 5/1992 | Yamaoka ................ | F16F 9/348 188/282.5 |
| 5,219,414 A | * | 6/1993 | Yamaoka ................. | F16F 9/48 188/284 |
| 6,672,436 B1 | * | 1/2004 | Keil ....................... | F16F 9/3214 188/322.14 |
| 6,793,049 B2 | | 9/2004 | Kazmirski | |
| 8,511,447 B2 | | 8/2013 | Nowaczyk et al. | |
| 9,080,629 B2 | | 7/2015 | Oukhedou et al. | |
| 9,810,282 B2 | | 11/2017 | Roessle et al. | |
| 2005/0284520 A1 | * | 12/2005 | Carlstedt ............... | F16F 9/3228 137/493 |
| 2017/0184245 A1 | * | 6/2017 | Nakano .................... | F16L 55/05 |

(Continued)

FOREIGN PATENT DOCUMENTS

| | | | | |
|---|---|---|---|---|
| DE | | 1101632 A1 | 7/1991 | |
| DE | | 19713784 A1 | * 6/1998 | .............. F16F 9/364 |

(Continued)

OTHER PUBLICATIONS

Machine translation of DE 19713784, retrieved Mar. 21, 2022 (Year: 2022).*

(Continued)

Primary Examiner — Bradley T King
(74) Attorney, Agent, or Firm — McGarry Bair PC

(57) ABSTRACT

A valve body for a damper includes a plurality of pressure tubes of the damper having different diameters. The valve body includes a plurality of fluid passages. The valve body further includes a plurality of stepped regions having different diameters relative to a valve axis of the valve body. Each stepped region is configured to be selectively coupled to one of the plurality of pressure tubes having a corresponding diameter.

20 Claims, 5 Drawing Sheets

(56) References Cited

U.S. PATENT DOCUMENTS

2018/0328444 A1* 11/2018 Paielli .................. F16F 9/3271
2019/0309816 A1* 10/2019 Shibata .................... F16F 9/54
2021/0108696 A1* 4/2021 Randall ................ F16F 15/283

FOREIGN PATENT DOCUMENTS

DE            10026356 A1 * 12/2001  .............. F16F 9/362
WO    WO-2012116190 A1 *  8/2012   ............ F16F 9/3482

OTHER PUBLICATIONS

Machine translation of DE 10026356, retrieved Mar. 22, 2022 (Year: 2022).*

* cited by examiner

VALVE BODY FOR A DAMPER

TECHNICAL FIELD

The present disclosure generally relates to dampers. More particularly, the present disclosure relates to a valve body for dampers.

BACKGROUND

Shock absorbers/dampers are generally installed on different types of equipment, such as vehicles, to dampen vibrations during operation. For example, dampers are generally connected between a body and the suspension system of the vehicle in order to absorb the vibrations. Conventional dampers typically include a pressure tube, a reserve tube, a piston, a piston rod, and one or more valves. During a compression stroke and a rebound stroke of the damper, the piston can limit a flow of damping fluid between working chambers defined within a body of the damper due to which the damper produces a damping force for counteracting the vibrations.

Typically, a damper is provided with a valve to control flow between the pressure tube and the reserve tube. The valve includes a valve body that is coupled to the pressure tube. A valve body can be typically used with a pressure tube having a specific diameter. Different valve bodies are required for pressure tubes having different diameters. Further, other components of the valve can also have to be changed for use with pressure tubes with different diameters. Several components of the valve can also have to be changed for different firmness settings of the damper. Such changes to the valve and the valve body for different configuration of the damper can lead to difficulties in manufacturing and assembly, and can increase an overall cost of the damper.

SUMMARY

In an aspect of the present disclosure, a valve body for a damper is provided. The valve body includes a plurality of pressure tubes of the damper having different diameters. The valve body includes a plurality of fluid passages. The valve body further includes a plurality of stepped regions having different diameters relative to a valve axis of the valve body. Each stepped region is configured to be selectively coupled to one of the plurality of pressure tubes having a corresponding diameter.

In another aspect of the present disclosure, a base valve assembly for a damper is provided. The base valve assembly includes a plurality of pressure tubes of the damper having different diameters. The base valve assembly includes a valve body defining a valve axis. The valve body includes a plurality of fluid passages. The valve body includes a plurality of stepped regions having different diameters relative to the valve axis. Each stepped region is configured to be selectively coupled to one of the plurality of pressure tubes having a corresponding diameter. The valve body further includes a plurality of compression lands having different diameters relative to the valve axis. The plurality of compression lands correspond to different firmness settings of the damper. Moreover, the valve body includes a valve disc directly engaging with the valve body to close a first fluid passage from the plurality of fluid passages. A dimension of the valve disc determines the engagement of the valve disc with one of the plurality of compression lands leading to the corresponding firmness setting.

In yet another aspect of the present disclosure, a damper is provided. The damper includes a pressure tube defining a fluid chamber. The damper includes a piston assembly disposed within the fluid chamber. The piston assembly divides the fluid chamber into a rebound chamber and a compression chamber. The damper further includes a reserve tube disposed around the pressure tube to define a reserve chamber between the pressure tube and the reserve tube. The damper includes a base valve assembly coupled to the pressure tube and fluidly disposed between the compression chamber and the reserve chamber. The base valve assembly includes a valve body defining a valve axis. The valve body includes a plurality of fluid passages. The valve body further includes a plurality of stepped regions having different diameters relative to the valve axis. The pressure tube is coupled to one of the plurality of stepped regions having a corresponding diameter. The valve body includes a plurality of compression lands having different diameters relative to the valve axis. The plurality of compression lands correspond to different firmness settings of the damper. The valve body includes a valve disc directly engaging with the valve body to close a first fluid passage from the plurality of fluid passages. A dimension of the valve disc determines the engagement of the valve disc with one of the plurality of compression lands leading to the corresponding firmness setting.

Other features and aspects of this disclosure will be apparent from the following description and the accompanying drawings.

DETAILED DESCRIPTION

Wherever possible, the same reference numbers will be used throughout the drawings to refer to same or like parts.

Aspects of the disclosure generally relate to a valve body for a damper. The valve body can be used with pressure tubes having different diameters and valve discs having different diameters. The valve body includes multiple stepped regions that can be selectively coupled with pressure tubes having different diameters. The valve body therefore prevents the need for separate valve bodies for different diameters of pressure tubes. Further, the valve body includes multiple compression lands that can be used with valve discs having different diameters. Different combinations of valve discs can therefore be used with the valve body for providing different damping characteristics. The valve body simplifies assembly and reduces manufacturing complexity and costs.

Figure 1:
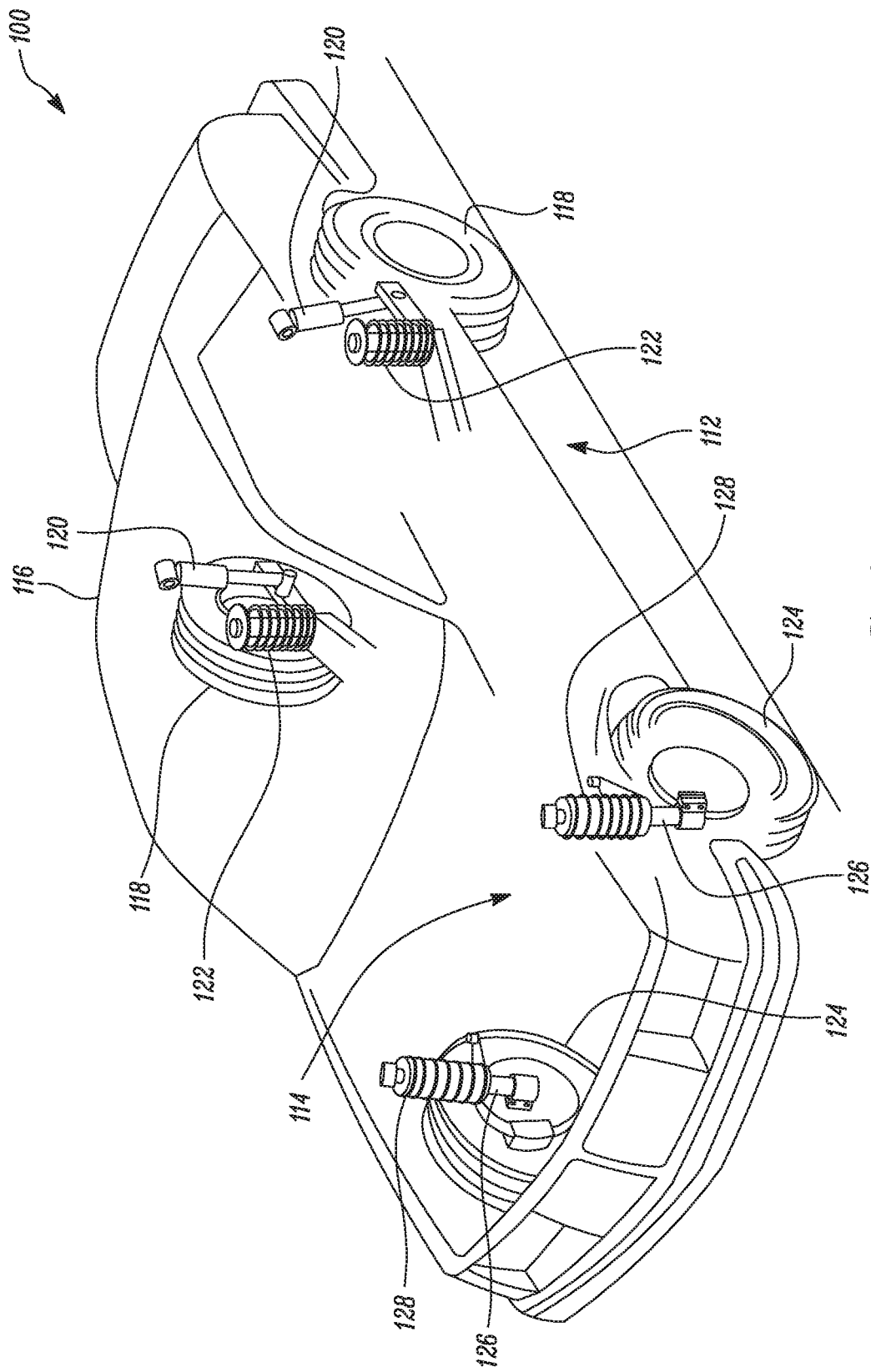
FIG. 1 is an illustration of a vehicle incorporating a suspension system, according to an aspect of the present disclosure.

FIG. 1 illustrates an exemplary vehicle 100 in accordance with the present disclosure. The vehicle 100 can include a vehicle driven by an internal combustion engine, an electric vehicle, or a hybrid vehicle. The vehicle 100 includes a rear suspension 112, a front suspension 114 and a body 116. The rear suspension 112 has a transversely extending rear axle assembly (not shown) adapted to operatively support a pair of rear wheels 118. The rear axle is attached to the body 116 by a pair of dampers 120 and a pair of springs 122. Similarly, the front suspension 114 includes a transversely extending front axle assembly (not shown) to operatively support a pair of front wheels 124. The front axle assembly is attached to the body 116 by a pair of dampers 126 and a pair of springs 128. The dampers 120 and 126 serve to dampen the relative motion of the unsprung portion (i.e., the front and rear suspensions 114, 112) with respect to the sprung portion (i.e., the body 116) of the vehicle 100. While the vehicle 100 has been depicted as a passenger car having front and rear axle assemblies, the dampers 120 and 126 can be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term damper as used herein is meant to refer to dampers in general and thus will include McPherson struts and other damper designs known in the art.

Figure 2:
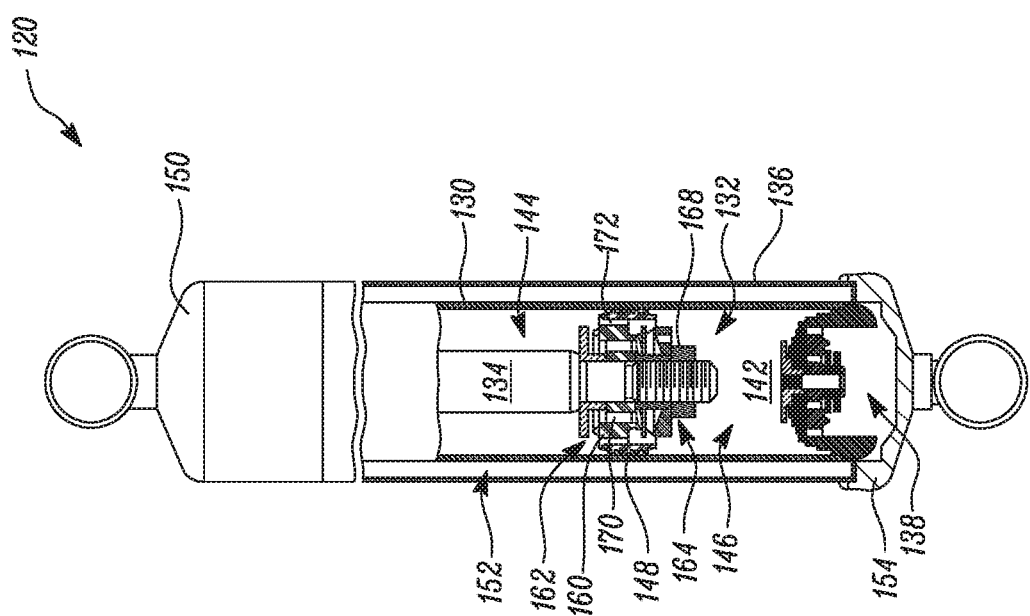
FIG. 2 is a schematic illustration of a damper associated with the suspension system of FIG. 1, according to an aspect of the present disclosure.

Referring now to FIG. 2, the damper 120 is shown in greater detail. While FIG. 2 illustrates only the damper 120, it is to be understood that the damper 126 also includes a valve design described below for the damper 120. The damper 126 only differs from the damper 120 in the manner in which it is adapted to be connected to the sprung and unsprung masses of the vehicle 100. The damper 120 includes a pressure tube 130, a piston assembly 132, a piston rod 134, a reserve tube 136 and a base valve assembly 138.

The pressure tube 130 defines a fluid chamber 142. The piston assembly 132 is slidably disposed within the fluid chamber 142 of the pressure tube 130 and divides the fluid chamber 142 into a rebound chamber 144 and a compression chamber 146. A seal 148 is disposed between the piston assembly 132 and the pressure tube 130 to permit sliding movement of the piston assembly 132 with respect to the pressure tube 130 without generating undue frictional forces as well as sealing the rebound chamber 144 from the compression chamber 146. The piston rod 134 is attached to the piston assembly 132 and extends through the rebound chamber 144 and through an upper end cap 150 which closes an upper end of the pressure tube 130. A sealing system seals the interface between the upper end cap 150, the reserve tube 136, the pressure tube 130 and the piston rod 134. The end of the piston rod 134 opposite to the piston assembly 132 is adapted to be secured to one of the sprung and unsprung mass of the vehicle 100. Valving within the piston assembly 132 controls the movement of fluid between the rebound chamber 144 and the compression chamber 146 during movement of the piston assembly 132 within the pressure tube 130. Because the piston rod 134 extends only through the rebound chamber 144 and not the compression chamber 146, movement of the piston assembly 132 with respect to the pressure tube 130 causes a difference in the amount of the fluid displaced in the rebound chamber 144 and the amount of fluid displaced in the compression chamber 146. The difference in the amount of the fluid displaced is known as the rod volume and it can flow through the base valve assembly 138. The reserve tube 136 is disposed around the pressure tube 130 to define a reserve chamber 152 between the pressure tube 130 and the reserve tube 136. An end cap 154 seals the end of the reserve tube 136. The end cap 154 is adapted to be secured to the other of the sprung and unsprung mass of the vehicle 100. The base valve assembly 138 is disposed at a lower end of the pressure tube 130. The base valve assembly 138 is coupled to the pressure tube 130 and fluidly disposed between the compression chamber 146 and the reserve chamber 152. The base valve assembly 138 controls fluid flow between the compression chamber 146 and the reserve chamber 152.

The piston assembly 132 includes a valve body 160, a piston compression valve assembly 162 and a piston rebound valve assembly 164. The valve body 160 is assembled with the piston compression valve assembly 162 and the piston rebound valve assembly 164. A nut 168 secures these components to the piston rod 134.

The valve body 160 defines a plurality of compression passages 170 and a plurality of rebound passages 172. The seal 148 includes a plurality of ribs (not shown) which mate with a plurality of annular grooves to permit sliding movement of the piston assembly 132.

Figure 3:
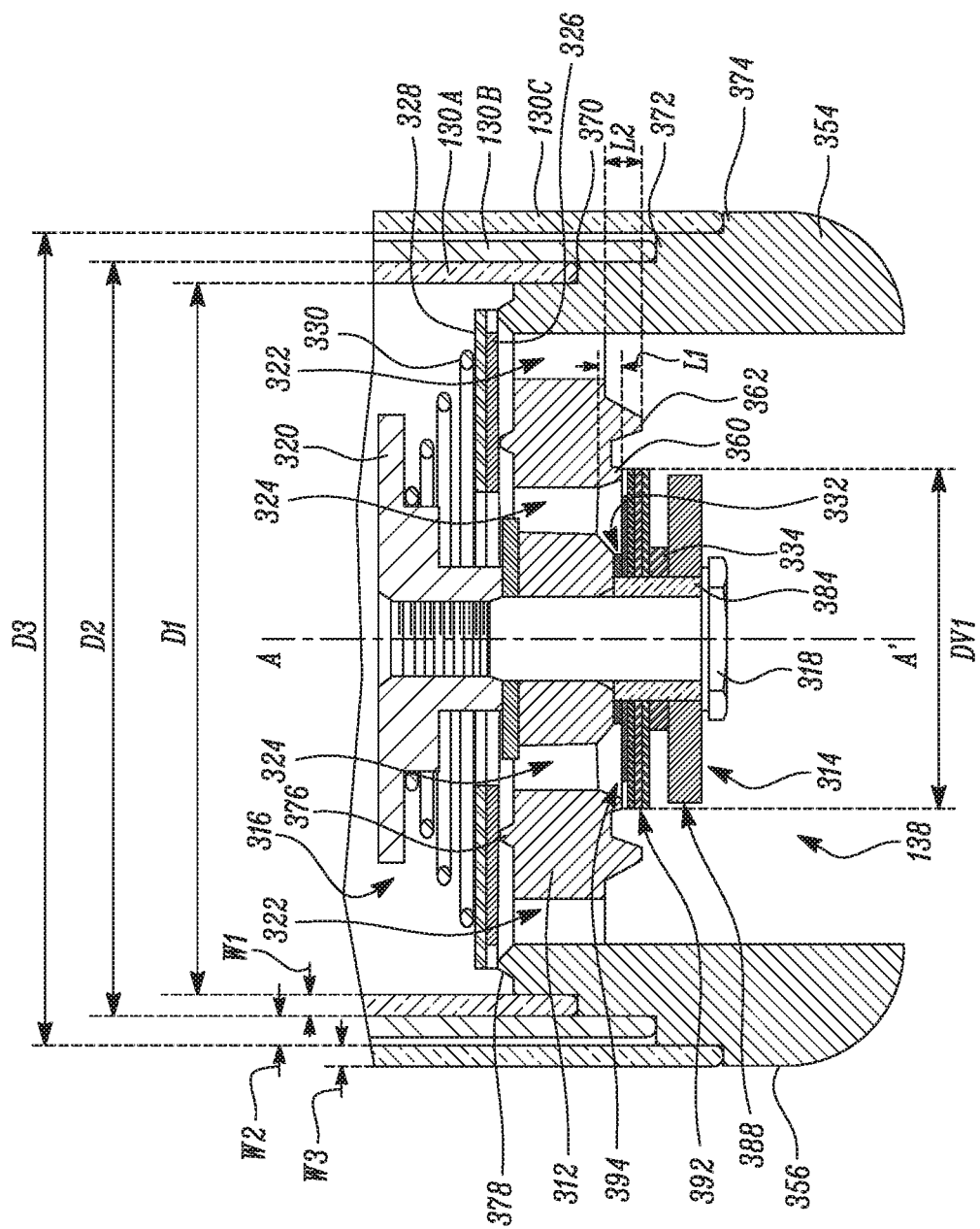
FIG. 3 is a schematic illustration of a valve assembly of the damper shown in FIG. 2, according to an aspect of the present disclosure.

Referring to FIG. 3, the base valve assembly 138 includes a valve body 312, a compression valve assembly 314 and a rebound valve assembly 316. The compression valve assembly 314 and the rebound valve assembly 316 are attached to the valve body 312 using a bolt 318 and a nut 320. The tightening of the nut 320 biases the compression valve assembly 314 towards the valve body 312. The valve body 312 can have a substantially annular configuration with the valve axis A-A' as the central axis. The valve body 312 can be made of any suitable material, such as metal or metal alloy, plastic, composite, or a combination thereof. The valve body 312 defines a plurality of fluid passages 324, 322. In the illustrated embodiment, the plurality of fluid passages includes a plurality of first fluid passages 324 (alternatively, compression passages 324) and a plurality of second fluid passages 322 (alternatively, rebound passages 322). A number and angular spacing of the first and second passages 324, 322 can vary as per application requirements. Each of the second fluid passages 322 is disposed radially outwards of each of the first fluid passages 324. The valve body 312 further includes a projecting portion 354 that defines a cylinder end.

The rebound valve assembly 316 includes a rebound orifice disc 326, a rebound valve disc 328 and a valve spring 330. The rebound orifice disc 326 abuts the valve body 312 at a first rebound land 376, and a second rebound land 378 and closes the rebound passages 322. The first and second rebound lands 376, 378 extend from an axial end of the valve body 312 that faces the compression chamber 146 (shown in FIG. 2). Moreover, the present disclosure can be readily implemented with a different location, number, thickness and length of the first rebound land 376 and the second rebound land 378. The valve spring 330 is disposed between the nut 320 and the rebound valve disc 328 to bias the rebound valve disc 328 and the rebound orifice disc 326 against the valve body 312. During a rebound stroke, a pressure of fluid in the compression chamber 146 is reduced causing fluid pressure in the reserve chamber 152 (shown in FIG. 2) to act against the rebound orifice disc 326 and the rebound valve disc 328. When the fluid pressure against the rebound orifice disc 326 and the rebound valve disc 328 overcomes the biasing load of the valve spring 330, the rebound orifice disc 326 and the rebound valve disc 328 can bend or, in some cases with substantially high pressure, separate from the valve body 312 to open the rebound passages 322 and allow fluid flow from the reserve chamber 152 to the compression chamber 146. The valve spring 330 can exert only a light load on the rebound orifice disc 326 and the rebound valve disc 328 and the compression valve assembly 314 acts as a check valve between the reserve chamber 152 and the compression chamber 146. The damping characteristics for a rebound stroke are controlled by the piston rebound valve assembly 164 as explained below but the rebound valve assembly 316 can be designed to contribute to the damping characteristics.

The valve body 312 includes a plurality of compression lands 360, 362 having different diameters relative to the valve axis A-A'. The plurality of compression lands 360, 362 correspond to different firmness settings of the damper 120. In the illustrated embodiment, the valve body 312 includes a first compression land 360 and a second compression land 362. In an example, the first compression land 360 can correspond to a firm setting of the damper 120, while the second compression land 362 can correspond to a comfort setting of the damper 120. The first and second compression lands 360, 362 extend from an axial end of the valve body 312 that is opposite to the compression chamber 146 (shown in FIG. 2). Specifically, the plurality of rebound lands 376, 378 are disposed axially opposite to the plurality of compression lands 360, 362. Each of the first and second compression lands 360, 362 can have a substantially annular configuration. Further, a diameter of the first compression land 360 is less than a diameter of the second compression land 362.

Further as illustrated in FIG. 3, the plurality of compression lands 360, 362 are radially disposed between the first fluid passages 324 and the second fluid passages 322. The first compression 360 is disposed proximal to the first fluid passages 324 and the second compression land 362 is disposed distal to the first fluid passages 324.

At least two compression lands from the plurality of compression lands 360, 362 have different lengths. In the illustrated embodiment, a length L1 of the first compression land 360 is less than a length L2 of the second compression land 362. The lengths L1 and L2 are defined parallel to the valve axis A-A' and indicate the lengths by which the first and second compression lands 360, 362 project from the valve body 312. The first and second compression lands 360, 362 can correspond to different firmness settings of the damper 120. A number, position, length and thickness of the first and second compression lands 360, 362 can be varied in accordance with various factors, for example, a firmness setting of the damper 120.

The compression valve assembly 314 includes a guiding sleeve 384, a first spacer 332, a washer 388, a plurality of first tunable discs 392, a first valve disc 394 and a second spacer 334. The first tunable discs 392 and the first valve disc 394 can correspond to the firm setting of the damper 120 and can belong to a family (say "A" family) of valve discs. Each of the first valve disc 394 and the first tunable discs 392 has a diameter DV1 relative to the valve axis A-A'. The diameter DV1 can be substantially similar to the diameter of the first compression land 360. A thickness and diameter of the first tunable discs 392 and the first valve disc 394 can be varied based on various factors, such as the firmness setting of the damper 120. A number of the first tunable discs 392 can also be varied.

The guiding sleeve 384 is received on the bolt 318 and is disposed between the valve body 312 and a head of the bolt 318. The washer 388, the spacer 332, the first tunable discs 392, the first spacer 332 and the second spacer 334 are all received on an outer surface of the guiding sleeve 384. In some embodiments, the washer 388, the spacer 332, the first tunable discs 392, the first spacer 332 and the second spacer 334 can be press-fitted on the guiding sleeve 384. The washer 388 is disposed between the head of the bolt 318 and the second spacer 334. The first valve disc 394 and the first tunable discs 392 are disposed between the first and second spacers 332, 334. The first valve disc 394 abuts the first compression land 360 to close the first fluid passages 324. The first valve disc 394 bends due to application of fluid pressure and opens the first fluid passages 324. The first tunable discs 392 can bend along with the first valve disc 394. The first spacer 332 can be a fulcrum disc that controls a bending diameter of the first valve disc 394 and the first tunable discs 392. The first spacer 332 can also axially align the first valve disc 394 with the first compression land 360. The second spacer 334 can be a preload disc that provides a preload on the first tunable discs 392 and the first valve disc 394. The washer 388 can be a super washer that minimizes or prevents bending of the base valve assembly 138.

The first valve disc 394 directly engages with the valve body 312 to close the first fluid passages 324. The first valve disc 394 elastically bends to open the first fluid passages 324. A dimension of the first valve disc 394 determines the engagement of the first valve disc 394 with one of the plurality of compression lands 360, 362 leading to the corresponding firmness setting of the damper 120. Specifically, the diameter DV1 of the first valve disc 394 determines the engagement of the first valve disc 394 with the first compression land 360 leading to the corresponding firmness setting, i.e., the firm setting. When fluid pressure is applied to the first valve disc 394 and the first tunable discs 392, a first or initial flow of fluid will flow through an orifice (not shown) defined by the first valve disc 394 or the valve body 312. This first or initial flow of fluid is used to tune the low speed damping and can control the steepness of the force versus velocity curve at low velocities of the piston assembly 132 (shown in FIG. 2). The number, diameter and thickness of the first valve disc 394 and the first tunable discs 392 can control the transition between low and medium velocities of the piston assembly 132. The first valve disc 394 and the first tunable discs 392 can deflect or bend to allow a second or additional fluid flow at the medium velocities of the piston assembly 132.

During a compression stroke, fluid in the compression chamber 146 is pressurized causing fluid pressure to react against the first valve disc 394 and the first tunable discs 392. A first or initial flow of fluid flows through the orifice in the first valve disc 394 at low velocities of the piston assembly 132. As the velocity of the piston assembly 132 increases, fluid pressure reacting against the first valve disc 394 and the first tunable discs 392 increases and eventually overcomes the bending load for the first valve disc 394 and the first tunable discs 392. This causes the first valve disc 394 and the first tunable discs 392 to elastically deflect and open the first fluid passages 324, thereby allowing a fluid flow from the compression chamber 146 to the reserve chamber 152. The design and strength of the first valve disc 394 and the first tunable discs 392 and the size of the first fluid passages 324 can determine the damping characteristics for the damper 120 in compression.

The valve body 312 further includes a plurality of stepped region, i.e., a stepped region 370, a stepped region 372, and a stepped region 374 having different diameters D1, D2, D3, respectively, relative to the valve axis A-A'. In the illustrated embodiment, D1<D2<D3. The valve body 312 and the base valve assembly 138 includes a plurality of pressure tubes 130A, 130B, 130C of the damper 120 having different diameters. Any one of the pressure tubes 130A, 130B, 130C can correspond to the pressure tube 130 of the damper 120 shown in FIG. 2. In the illustrated embodiment of FIG. 2, the pressure tube 130 corresponds to the pressure tube 130C. The pressure tube 130A is coupled to the stepped region 370 of the plurality of stepped regions 370, 372, 374 having the corresponding diameter D1. Specifically, the diameter D1 can be substantially equal to an inner diameter of the pressure tube 130A. Similarly, the pressure tube 130B is coupled to the stepped region 372 having the corresponding diameter D2. The diameter D2 can be substantially equal to an inner diameter of the pressure tube 130B. The pressure tube 130C is coupled to the stepped region 374 having the corresponding diameter D3. The diameter D3 can be substantially equal to an inner diameter of the pressure tube 130C. The pressure tubes 130A, 130B, 130C can be coupled to the corresponding stepped regions 370, 372, 374 by various methods, such as welding, press-fitting, adhesives, or a combination thereof. The pressure tubes 130A, 130B, 130C can have equal or different thickness.

In the illustrated embodiment, the valve body 312 includes three stepped regions 370, 372, 374, however the valve body 312 can include less or more number of the stepped regions as per the application. Further, the plurality of stepped regions 370, 372, 374 are disposed adjacent to each other. Specifically, the plurality of stepped regions 370, 372, 374 include three stepped regions disposed adjacent to each other. In another embodiment, two or more of the stepped regions 370, 372, 374 can be spaced apart from one another. Moreover, the plurality of stepped regions 370, 372, 374 are disposed on an outer surface 356 of the valve body 312. Each stepped region 370, 372, 374 is substantially L-shaped and defines a height and a width. Further, each stepped region 370, 372, 374 has a substantially annular configuration with respect to the valve axis A-A'. The diameters D1, D2, D3 are the inner diameters of the corresponding stepped regions 370, 372, 374. The width is defined perpendicular to the valve axis A-A', while the height is defined parallel to the valve axis A-A'. In some embodiment, each stepped region 370, 372, 374 has a different size, i.e., different height/or width, to accommodate the one of the plurality of pressure tubes 130A, 130B, 130C. In some embodiments, D1 is approximately 30 mm, D2 is approximately 32 mm, and D3 is approximately 35 mm. A width W2 of the stepped region 374 is greater than a width W1 of the stepped region 370 and a width W3 of the stepped region 374 (i.e., W2>W1, W3) in order to accommodate the uneven difference between the diameters D1, D2, D3. Dimensions of the stepped regions 370, 372, 374 can be varied based on an inner diameter and a thickness of the corresponding pressure tubes 130A, 130B, 130C.

The stepped regions 370, 372, 374 enable the base valve assembly 138 and the valve body 312 to be assembled with the pressure tubes 130A, 130B, 130C having different diameters. The base valve assembly 138 can therefore be assembled with a pressure tube having a desired diameter. Separate base valve assemblies and valve bodies are not required for pressure tubes having different diameters. This can allow ease of assembly and decrease manufacturing complexity and costs.

Figure 4:
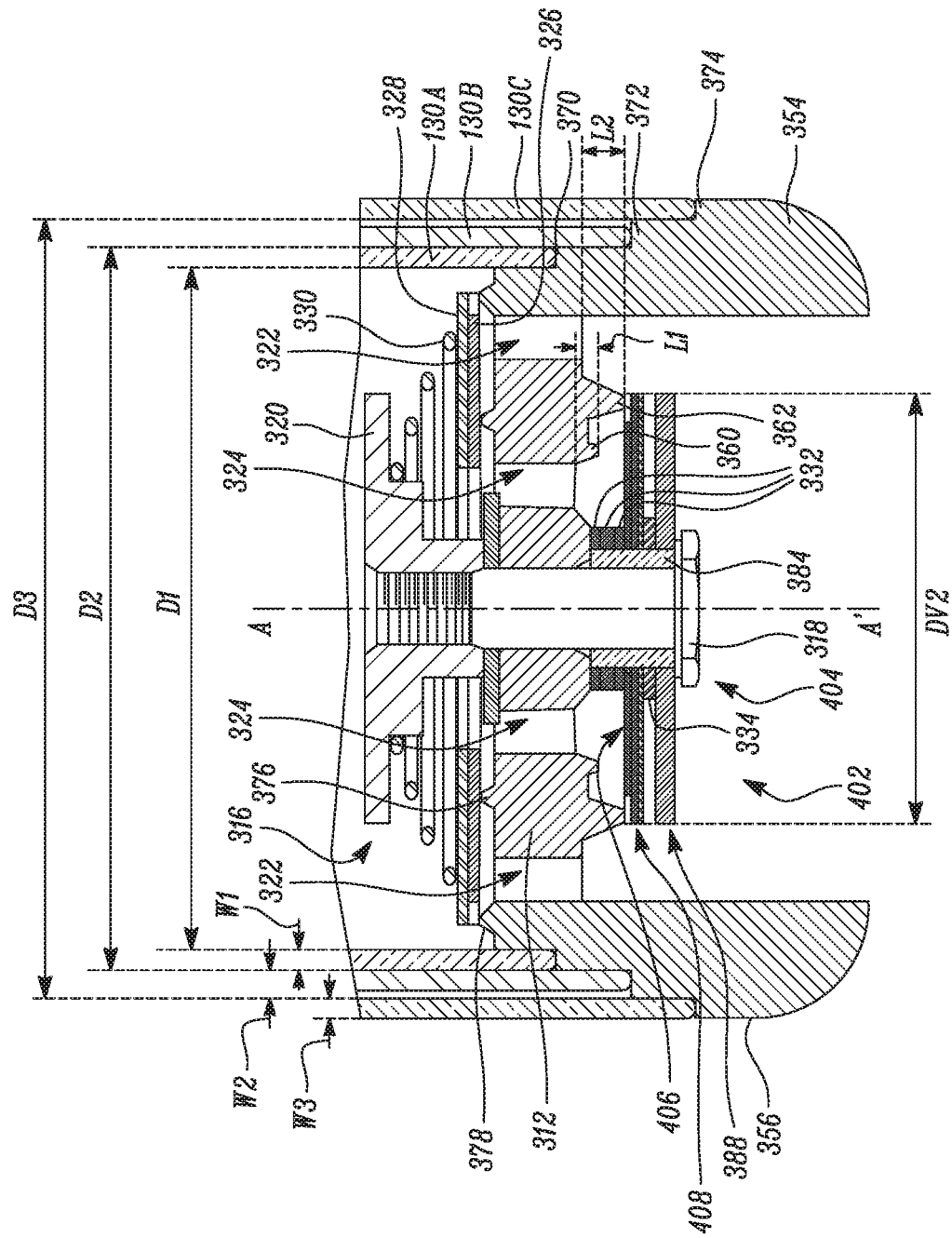
FIG. 4 is an illustration of the valve assembly with another type of valve disc, according to an aspect of the present disclosure.

The second compression land 362 can alternatively or additionally engage with a valve disc having a diameter greater than the diameter DV1 of the first valve disc 394 and the first tunable discs 392. FIG. 4 illustrates a base valve assembly 402. The base valve assembly 402 is substantially similar in structure as the base valve assembly 138 shown in FIG. 3. However, the base valve assembly 402 includes a compression valve assembly 404 that includes a second valve disc 406 and a plurality of second tunable discs 408.

The compression valve assembly 404 further includes multiple first spacers 332 such that the second valve disc 406 abuts the second compression land 362. The first spacers 332 can account for the difference between the lengths L1, L2 of the first and second compression lands 360, 362 and axially aligns the second valve disc 406 with the second compression land 362.

The second tunable discs 408 and the second valve disc 406 can correspond to the comfort setting of the damper 120 and can belong to E family of valve discs. Each of the second valve disc 406 and the second tunable discs 408 has a diameter DV2 relative to the valve axis A-A'. The diameter DV2 can be substantially similar to the diameter of the second compression land 362.

The diameter DV2 of the second valve disc 406 and the second tunable discs 408 is greater than the diameter DV1 of the first valve disc 394 and the first tunable discs 392. A dimension of the second valve disc 406 determines the engagement of the second valve disc 406 with one of the plurality of compression lands 360, 362 leading to the corresponding firmness setting. Specifically, the diameter DV2 of the second valve disc 406 determines the engagement of the second valve disc 406 with the second compression land 362 leading to the comfort setting.

The second valve disc 406 directly engages with the second compression land 362 of the valve body 312 to close the first fluid passages 324. The second valve disc 406 elastically bends to open the first fluid passages 324. An operation of the compression valve assembly 404 can be substantially similar to the operation of the compression valve assembly 314. However, the second valve disc 406 and the second tunable discs 408 have a pressure setting and a firmness setting that are different from that of the first valve disc 394 and the first tunable discs 392.

A thickness and diameter of the second tunable discs 408 and the second valve disc 406 can be varied based on various factors, such as the firmness setting of the damper 120. A number of the second tunable discs 408 can also be varied.

Figure 5:
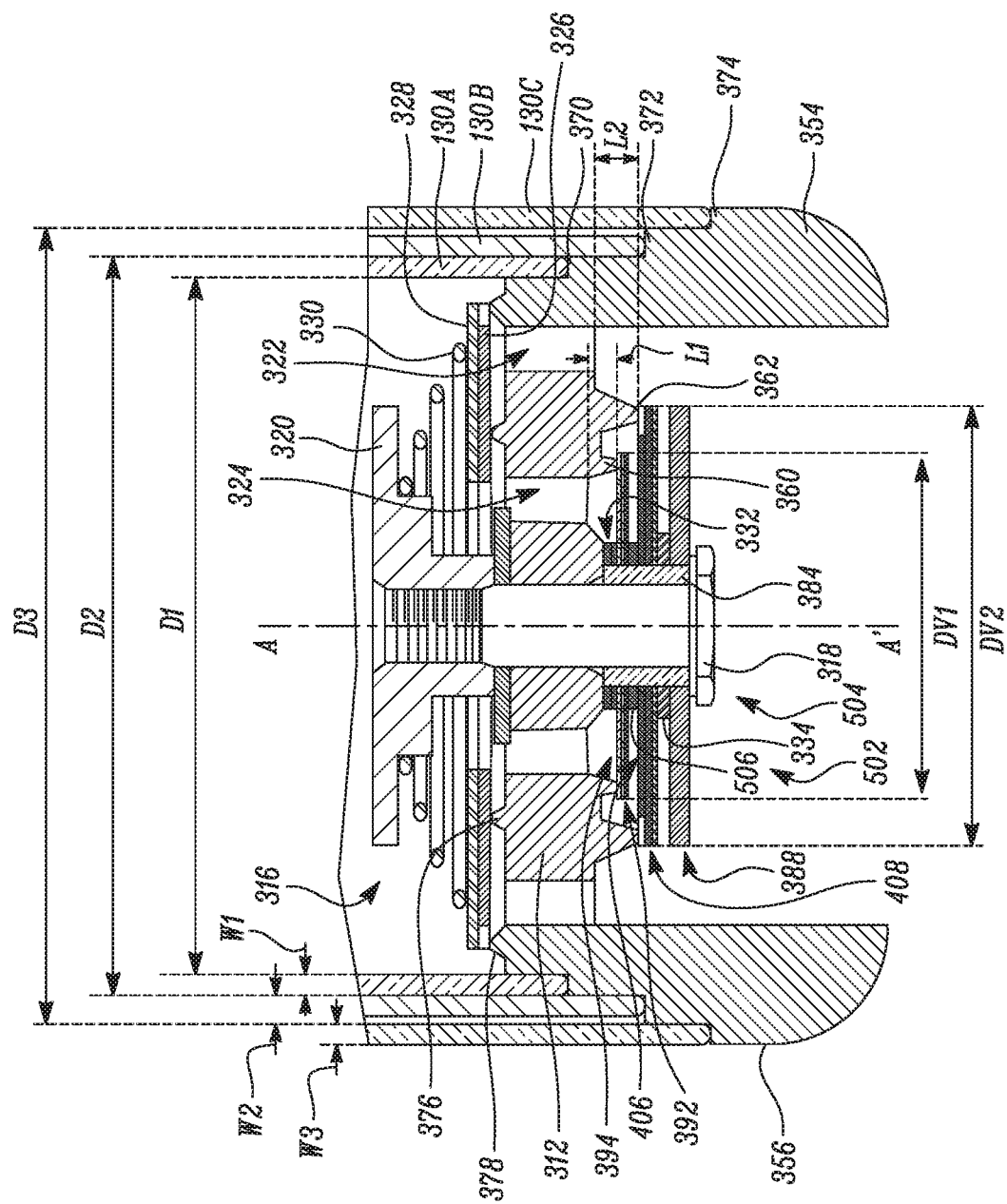
FIG. 5 is an illustration of the valve assembly with two types of valve discs, according to an aspect of the present disclosure.

FIG. 5 illustrates a base valve assembly 502. The base valve assembly 502 is substantially similar in structure as the base valve assembly 138 shown in FIG. 3. However, the base valve assembly 502 includes the plurality of valve discs 394, 406 having different diameters DV1, DV2. Each compression lands 360 362 is configured to be selectively engaged with one of the plurality of valve discs 394, 406. Specifically, the base valve assembly 502 includes a compression valve assembly 504 that includes the first valve disc 394, the first tunable discs 392, the second valve disc 406, and second tunable discs 408. The first valve disc 394 engages with the first compression land 360 and the second valve disc 406 engages with the second compression land 362.

The compression valve assembly 504 further includes first spacers 332 disposed between the valve body 312 and the first valve disc 394. Further, third spacers 506 are further disposed between the first tunable discs 392 and the second valve disc 406. The first and third spacers 332, 506 can axially align the first and second valve discs 394, 406 with the first and second compression lands 360, 362, respectively.

The compression valve assembly 504 can have a two-step opening of the first fluid passages 324. The first and second valves 394, 404 and the first and second tunable discs 392, 408 can sequentially open based on the fluid pressure.

The valve body 312 can therefore be used with different configurations of valve discs corresponding to different comfort settings of the damper 120. Different valve bodies are not required for different firmness settings. Different combinations of valve discs can be used with the valve body 312 as per the desired comfort settings of the damper 120. This can simplify assembly and reduce manufacturing complexity and costs.

While aspects of the present disclosure have been particularly shown and described with reference to the embodiments above, it will be understood by those skilled in the art that various additional embodiments can be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A base valve assembly for a damper comprising:
    a valve body defining a valve axis, the valve body comprising:
        an upper portion comprising an outer surface comprising a plurality of stepped regions having different diameters relative to the valve axis, wherein each stepped region is configured to be selectively coupled to one of a plurality of pressure tubes having a corresponding diameter;
        a plurality of compression lands along an inner surface of the upper portion and having different diameters relative to the valve axis, the plurality of compression lands corresponding to different firmness settings of the damper;
        a plurality of fluid passages along the inner surface of the upper portion comprising at least two compression fluid passages for accommodating fluid movement during a compression stroke and at least two rebound passages for accommodating fluid movement during a rebound stroke; each of the at least two compression passages located radially outward of the valve axis and each of the at least two rebound passages located radially outward of the at least two compression fluid passages;
        a guiding sleeve abutting the inner surface; and
        a valve disc received on an outer surface of the guiding sleeve and directly engaging with the valve body to close the at least two compression fluid passages from the plurality of fluid passages, wherein a dimension of the valve disc determines the engagement of the valve disc with one of the plurality of compression lands leading to the corresponding firmness setting.

2. The base valve assembly of claim 1, wherein the plurality of stepped regions are disposed adjacent to each other.

3. The base valve assembly of claim 1, wherein the plurality of compression lands comprises at least one first compression land disposed proximal to one of the at least two compression fluid passages and at least one-second compression land disposed distal to one of at least two first compression fluid passages, and wherein a length of the at least one first compression land is less than a length of the at least one second compression land.

4. The base valve assembly of claim 1, wherein the valve disc elastically bends to open at least one of the at least two first compression fluid passages.

5. The valve body of claim 1, wherein the at least three stepped regions have different diameters relative to the valve axis of the valve body.

6. The valve body assembly of claim 1, wherein the valve body further comprises a plurality of tunable discs received on an outer surface of the guiding sleeve and positioned directly adjacent the valve disc.

7. The valve body assembly of claim 6, further comprising a first spacer positioned between the valve body and the valve disc.

8. The valve body assembly of claim 7, further comprising a second spacer positioned adjacent the plurality of tunable discs.

9. The valve body assembly of claim 8, further comprising a washer positioned adjacent the second spacer.

10. The valve body of claim 9, wherein the first spacer, the valve disc, the plurality of tunable discs, the second spacer and the washer are press fit on the outer surface of the guiding sleeve.

11. A damper comprising:
    a pressure tube defining a fluid chamber;
    a piston assembly disposed within the fluid chamber, the piston assembly dividing the fluid chamber into a rebound chamber and a compression chamber;
    a reserve tube disposed around the pressure tube to define a reserve chamber between the pressure tube and the reserve tube;
    a base valve assembly coupled to the pressure tube and fluidly disposed between the compression chamber and the reserve chamber, the base valve assembly comprising:
        a valve body defining a valve axis, the valve body comprising:
            an upper portion comprising an outer surface comprising at least three stepped regions having different diameters relative to the valve axis, wherein the pressure tube is coupled to one of the at least three stepped regions having a corresponding diameter;
            a plurality of compression lands having different diameters relative to the valve axis, the plurality of compression lands corresponding to different firmness settings of the damper;
            a plurality of fluid passages along an inner surface of the upper portion comprising at least two first fluid passages for accommodating fluid movement during a compression stroke and at least two second passages for accommodating fluid movement during a rebound stroke; each of the at least two first passages located radially outward of the valve axis and each of the at least two second passages located radially outward of the at least two first fluid passages; and,
            a guiding sleeve abutting the inner surface; and
            a valve disc received on an outer surface of the guiding sleeve and directly engaging with the valve body to close the at least two compression fluid passages from the plurality of fluid passages, wherein a dimension of the valve disc determines the engagement of the valve disc with one of the plurality of compression lands leading to the corresponding firmness setting.

12. The damper of claim 11, wherein the three stepped regions are disposed adjacent to each other.

13. The damper of claim 11, wherein the plurality of compression lands comprises a first compression land disposed proximal to the first fluid passage and a second compression land disposed distal to the first fluid passage, and wherein a length of the first compression land is less than a length of the second compression land.

14. The damper of claim 11, wherein the valve body further comprises a lower portion comprising a projection integral with the upper portion and defining a cylinder end.

15. The damper of claim 11, wherein the valve body further comprises a plurality of tunable discs received on an outer surface of the guiding sleeve and positioned directly adjacent the valve disc.

16. The damper of claim 15, further comprising a first spacer positioned between the valve body and the valve disc.

17. The damper of claim 16, further comprising a second spacer positioned adjacent the plurality of tunable discs.

18. The damper of claim 17, further comprising a washer positioned adjacent the second spacer.

19. The damper of claim 18, wherein the first spacer, the valve disc, the plurality of tunable discs, the second spacer and the washer are received on the outer surface of the guiding sleeve.

20. The damper of claim 18, wherein the first spacer, the valve disc, the plurality of tunable discs, the second spacer and the washer are press fit on the outer surface of the guiding sleeve.

\* \* \* \* \*